Patented June 5, 1934

1,961,150

UNITED STATES PATENT OFFICE

1,961,150

PRODUCTION OF MONOCARBOXYLIC ACIDS AND THEIR DERIVATIVES

Alphons O. Jaeger, Mount Lebanon, Pa., assignor to The Selden Company, Pittsburgh, Pa., a corporation of Delaware No Drawing. Application May 1, 1929, Serial No. 359,722

24 Claims. (Cl. 260—108)

This invention relates to the production of monocarboxylic acids and their salts and derivatives by splitting off carboxyl groups from the corresponding polycarboxylic acid compounds.

It has been proposed in the past to heat calcium phthalate in order to split off a carboxyl group and produce benzoic acid, or rather calcium benzoate, the reaction taking place in the presence of calcium hydroxide. This process has many disadvantages, the yield being low unless it is carried out in the presence of a diluent, and the temperature control of the reaction is rather difficult. According to the present invention salts of polycarboxylic acids such as phthalic acid, naphthalic acid, diphenic acid, maleic acid, fumaric acid, succinic acid, adipic acid, and the like, are subjected to heat in the presence of a protecting atmosphere which may contain steam or reducing gases such as hydrogen, CO, methyl alcohol, etc., or both may be used. Better results are obtained and the reaction proceeds more smoothly when steam is used. The salts may be alkali or alkaline earth metal salts or they may be salts of the less basic metals such as copper, nickel, zinc, iron, cobalt, cadmium, etc. When the alkali or alkaline earth metal salts are used the corresponding monocarboxylic acids form the major portion of the product. In some cases, for example when salts of phthalic acid are treated, particularly where the acid salts are used, benzoic acid is obtained as the main product and may be sublimed out in considerable quantity, thus recovering quite a large portion in a relatively purified form. When the salts of metals having the character of reduction catalysts are used, for example nickel, zinc, etc., especially where the protecting atmosphere contains hydrogen, aldehydes are obtained as a large and in some cases the major constituent of the reaction product. It should be understood that in many cases the reaction does not go to completion and unchanged polycarboxylic acid salts remain unconverted. These can be reused if necessary after suitable separation.

When working with salts of metals having the character of strong reduction catalysts in the presence of hydrogen at high temperatures, there is frequently a considerable formation of hydrocarbons. This is especially true in the case of salts of phthalic acid where considerable amounts of benzol are produced if the temperature is too high.

In its broader aspects, the invention is not limited to any particular type of apparatus, but I have found that it is desirable to maintain a uniform temperature or zones of uniform temperature in the reaction and I, therefore, prefer to force the reacting mixture through relatively small tubes which permit an accurate temperature control. The material may be carried through at the predetermined speed by means of suitable screw conveyers. The use of small reaction chambers is also desirable because many of the reactions are exothermic and the relatively small bulk of reacting material to temperature control surface in the case of small reaction chambers prevents obtaining excessive temperatures. The temperature regulation of the reaction chambers may be by any suitable means but I prefer to use baths such as molten metal baths or baths of eutectic salt mixtures. Another effective type of control consists in the use of temperature controlling baths which boil at or near the temperature desired and which may, for example, be mercury or mercury alloys, such as alloys of mercury and lead, mercury and cadmium, and the like. In the case of mercury the boiling point may be varied by causing it to boil under varying pressures.

The reaction time will vary with the particular salt and with the temperature. In general the reaction is comparatively slow and the mixture should be subjected to the desired temperature for a considerable period of time, ranging up to an hour or more in some cases.

As has been pointed out above, the reaction does not ordinarily go to completion, some unchanged polycarboxylic acid salts remaining. The extent to which the reaction is carried will depend on the particular conditions and materials used, and in general in every case an optimum compromise will be chosen which will give a maximum conversion without too great losses by decomposition. The particular compromise chosen will, of course, depend on the reaction in question.

The invention will be described in connection with the following specific examples which illustrate a few typical embodiments of the invention.

Example 1

Neutral calcium phthalate is heated for about an hour in the presence of 25 liters of hydrogen per mol. Reaction begins at 350° C. but is very slight, giving less than a percent of benzaldehyde and benzoic acid, which appears as calcium benzoate. At 370° C. the amount of benzoic acid increases to about 12% and that of benzaldehyde to about 4%, 82% of the calcium phthalate remaining unchanged. At 415° the percentage of benzoic acid has increased up to 43.5%, benzaldehyde up to 10.5%, and unchanged phthalic about 44%, representing a recovery of about 98% of the converted material. At 435° C. the benzoic acid increases to 63%, benzaldehyde remaining stationary at about 10.6%, and the amount of phthalic recovered drops to 22.2%, representing about 96% recovery. When the reaction is carried on at 395° C. in the presence of both steam and hydrogen the recoveries of benzoic acid are about 24.6%, benzaldehyde 9.4%, and unchanged phthalic 62%, the recovery of converted material, however, rising to 99%. This shows that steam has a tendency to reduce side reactions and increase the percentage of recovery. The above percentages have been expressed in terms of benzoic acid, but it is to be understood that the product appears as calcium benzoate due to the resistance of this substance to hydrolysis and decomposition at high temperatures. Whether a salt of the monocarboxylic acid or the free acid itself is obtained depends upon the stability of the monocarboxylic acid salt under operating conditions.

The above process was carried out in an apparatus containing reaction tubes 3½" i. d. by 4" o. d., each tube being provided with a screw conveyer at very low speed so that the material took an hour to traverse the tubes. The hydrogen was under substantially atmospheric pressure. If the pressure on the hydrogen is increased, slightly higher yields of benzaldehyde are obtained. Any suitable pressure may be used, but in general it is desirable from an apparatus standpoint to use as low a pressure as is practicable. The hydrogen of course is recirculated.

Similar results are obtained when calcium naphthalate, calcium adipate or calcium maleate are heated, the corresponding products of course being naphthoic acid and naphthoic aldehyde, valeric acid and valeric aldehyde, and propionic acid and aldehyde.

*Example 2*

Zinc phthalate admixed with quartz as a diluent is passed through an apparatus as described in Example 1 in contact with hydrogen. The amount of benzoic acid obtained is very slight, being less than 5%. The salt is very reactive and at temperatures between 325 and 410° C. the whole of the phthalate is converted, taking an hour at 350–360° C., one and one-half hours at 325° C., and three-quarters of an hour at 400° C. Benzaldehyde is obtained in good yields, but there is some loss by formation of benzol, which can be reduced by using CO instead of hydrogen. Other impurities, such as diphenyl, are also produced.

Similar results are obtained with zinc naphthalate.

*Example 3*

Zinc phthalate is treated in an apparatus as described in Example 1 in an atmosphere of steam, beginning traces of reactions at 300° C. At 320° C. a product is obtained containing 63% benzoic acid and 8% benzaldehyde. At 360–400° C. about 75% benzoic acid and somewhat over 1% benzaldehyde together with an oil which becomes solid on cooling and which appears to contain ketones and similar compounds admixed with aromatic hydrocarbons.

Similar results are obtained with zinc adipate, but the hydrocarbons produced are, of course, aliphatic and not aromatic.

*Example 4*

Copper phthalate is heated as described in Example 1 in an atmosphere of hydrogen. The reaction is quite strongly exothermic and it starts at 220° C., being quite vigorous at 300° C., and almost uncontrollable at 360° C. The addition of steam moderates the reaction at 270° C. and 65% free benzoic acid is obtained. When carrying out the reaction for three hours at 300° C. in the presence of both steam and hydrogen, the amount of benzoic acid increases to 75%. Benzaldehyde is not formed to any considerable extent.

*Example 5*

Nickel phthalate is heated in an atmosphere of hydrogen and reaction appears to start at a temperature about 50° higher than copper phthalate, namely, 270° C. At 350° 67% of benzoic acid is obtained if hydrogen alone is present or if steam alone is present, while the percentage rises to 78% when both hydrogen and steam are present. A small quantity of benzaldehyde is also formed.

Similar results are obtained when a mixture of salts is used such as zinc phthalate and copper phthalate; iron phthalate and zinc phthalate; iron phthalate, zinc phthalate and copper phthalate; copper phthalate and nickel phthalate, etc.

What is claimed as new is:

1. A method of transforming polycarboxylic acid salts into compounds containing only a single CO group, which comprises subjecting a salt of a polycarboxylic acid to a temperature at which carboxyl groups are split off in the presence of a protecting atmosphere included in the group consisting of steam, reducing gases free from hydrogen, and hydrogen containing gases at a pressure below that at which hydrogenation takes place.

2. A method according to claim 1, in which the salt is of a metal other than the alkali and alkaline earth metals.

3. A method according to claim 1, in which the salt is of a metal which is a reduction catalyst.

4. A method according to claim 1, in which the salt is a salt of an aromatic polycarboxylic acid.

5. A method of transforming polycarboxylic acid salts into compounds containing only a single CO group, which comprises subjecting a salt of a polycarboxylic acid to a temperature at which carboxyl groups are split off in the presence of a protecting atmosphere containing steam.

6. A method according to claim 5, in which the salt is a salt of an aromatic polycarboxylic acid.

7. A method of transforming polycarboxylic acid salts into compounds containing only a single CO group, which comprises subjecting a salt of a polycarboxylic acid to a temperature at which carboxyl groups are split off in the presence of a protecting atmosphere included in the group consisting of steam, reducing gases free from hydrogen, and hydrogen containing gases at a pressure below that at which hydrogenation takes place.

8. A method according to claim 7, in which the salt is a salt of an aromatic polycarboxylic acid.

9. A method of transforming polycarboxylic acid salts into compounds containing only a single CO group, which comprises subjecting a salt of a polycarboxylic acid to a temperature at which carboxyl groups are split off in the presence of a protecting atmosphere containing steam and hydrogen.

10. A method of transforming salts of phthalic acid into oxomethyl benzene compounds, which comprises subjecting a salt of a phthalic acid to a temperature at which carboxyl groups are split off in the presence of a protecting atmosphere included in the group consisting of steam, reducing gases free from hydrogen, and hydrogen containing gases at a pressure below that at which hydrogenation takes place.

11. A method according to claim 10, in which the phthalate is a phthalate of a metal other than the alkali and alkaline earth metals.

12. A method according to claim 10, in which the phthalate is of a metal which is a reduction catalyst.

13. A method according to claim 10, in which the phthalate is the zinc phthalate.

14. A method of transforming salts of phthalic acid into oxomethyl benzene compounds, which comprises subjecting a salt of a phthalic acid to a temperature at which carboxyl groups are split off in the presence of a protecting atmosphere containing steam.

15. A method of transforming salts of phthalic acid into oxomethyl benzene compounds, which comprises subjecting a salt of a phthalic acid to a temperature at which carboxyl groups are split off in the presence of a protecting atmosphere included in the group consisting of steam, reducing gases free from hydrogen, and hydrogen containing gases at a pressure below that at which hydrogenation takes place.

16. A method of transforming salts of phthalic acid into oxomethyl benzene compounds, which comprises subjecting a salt of a phthalic acid to a temperature at which carboxyl groups are split off in the presence of a protecting atmosphere containing both steam and hydrogen.

17. A method of transforming polycarboxylic acid salts into compounds containing only a single group of the formula —COX in which X is hydrogen or oxygen linked to a metal which comprises subjecting a salt of the polycarboxylic acid with a metal included in the group consisting of copper, nickel, zinc, iron, cobalt and cadmium to a temperature at which carboxyl groups are split off in the presence of a protecting atmosphere included in the group consisting of steam, reducing gases free from hydrogen, and hydrogen containing gases at a pressure below that at which hydrogenation takes place.

18. A method according to claim 17 in which the protecting atmosphere consists of steam.

19. A method of transforming a zinc salt of a polycarboxylic acid into compounds containing only a single group of the formula—COX in which X is hydrogen or oxygen linked to a metal which comprises subjecting a zinc salt of polycarboxylic acid to a temperature at which carboxyl groups are split off in the presence of a protecting atmosphere included in the group consisting of steam, reducing gases free from hydrogen, and hydrogen containing gases at a pressure below that at which hydrogenation takes place.

20. A method according to claim 19 in which the protecting atmosphere consists of steam.

21. A method of transforming salts of phthalic acid into compounds containing the benzoyl radical, which comprises subjecting a phthalate of the metal included in the group consisting of copper, nickel, zinc, iron, cobalt and cadmium to a temperature at which the carboxyl groups are split off in the presence of a protecting atmosphere included in the group consisting of steam, reducing gases free from hydrogen, and hydrogen containing gases at a pressure below that at which hydrogenation takes place.

22. A method according to claim 21 in which the protecting atmosphere consists of steam.

23. A method of transforming a zinc phthalate into a compound containing the benzoyl radical, which comprises subjecting zinc phthalate to a temperature at which the carboxyl groups are split off in the presence of a protecting atmosphere included in the group consisting of steam, reducing gases free from hydrogen, and hydrogen containing gases at a pressure below that at which hydrogenation takes place.

24. A method according to claim 23 in which the protecting atmosphere consists of steam.

ALPHONS O. JAEGER.